United States Patent [19]

Kanamaru

[11] Patent Number: 4,800,446
[45] Date of Patent: Jan. 24, 1989

[54] VIDEO DISK RECORDED WITH VIDEO AND DIGITAL DATA AND RECORDING/REPRODUCING APPARATUS THEREFOR

[75] Inventor: Hitoshi Kanamaru, Saitama, Japan

[73] Assignee: Pioneer Electronic Corporation, Tokyo, Japan

[21] Appl. No.: 931,826

[22] Filed: Nov. 18, 1986

[30] Foreign Application Priority Data

Nov. 18, 1985 [JP] Japan .................................. 60-258325

[51] Int. Cl.$^4$ ............................................. H04N 5/92
[52] U.S. Cl. ...................................... 358/343; 358/342
[58] Field of Search ............... 358/343, 342, 312, 907; 360/19.1, 20, 10.1, 10.2

[56] References Cited

U.S. PATENT DOCUMENTS 4,372,473  6/1987  Sugiyama ........................... 358/341
4,680,647  7/1987  Moriyama ........................... 358/343

*Primary Examiner*—Donald McElheny, Jr.
*Attorney, Agent, or Firm*—Sughrue, Mion, Zinn, Macpeak & Seas

[57] ABSTRACT

An apparatus and method for recording both a television picture signal and a digital data signal onto one track of a video disk. The digital data is divided into fixed length blocks. The video synchronization pulse is detached from a previous field and the digital data is positioned to have a trailing end at the following video synchronization pulse. Therefore, after a predetermined delay, the modulated digital data and modulated television picture signals are added and recorded on the video disk.

4 Claims, 8 Drawing Sheets

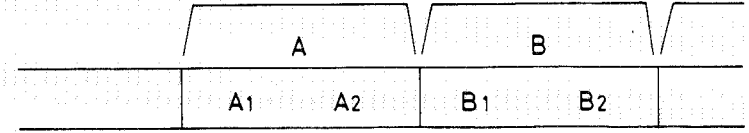
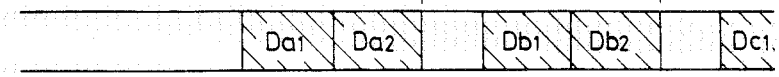
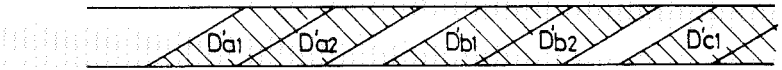
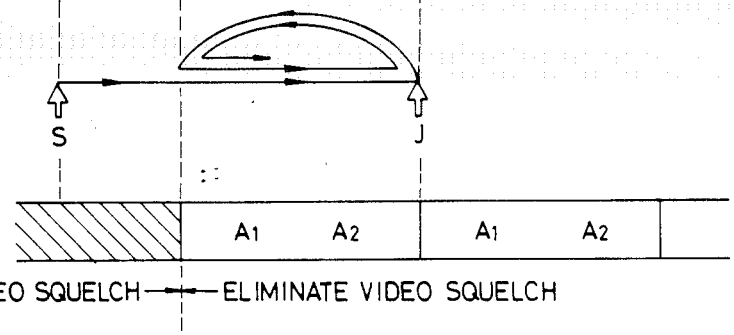
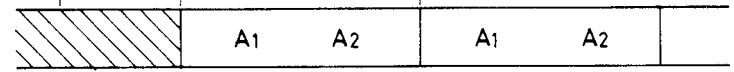
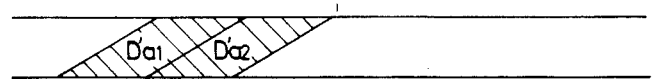

VIDEO DISK RECORDED WITH VIDEO AND DIGITAL DATA AND RECORDING/REPRODUCING APPARATUS THEREFOR

BACKGROUND OF THE INVENTION

1. Field of the Invention

The present invention relates both to a video disk on which television picture signals are recorded, and to a recording and reproducing apparatus therefor.

2. Background of the Invention

Recently disks for recording information thereon with high density have been developed and have been commercialized. Typical examples thereof are video disks and digital audio disks. The disks are classified into several types. Of those, an optical type of video disk has a spectral distribution such as shown in FIG. 6. Specifically, a television picture signal is recorded by frequency modulation of a carrier wave of 8.1 MHz to make the synchronization chip level 7.6 MHz and make the white level 9.3 MHz. An accompanying audio signal such as a stereo signal, a bilingual signal, or the like, is recorded by frequency modulation of carrier waves at 2.3 MHz and 2.3 MHz. On the other hand, an optical type of digital audio disk has a spectral distribution such as shown in FIG. 7, and an EFM signal of a pulse-code-modulated stereo signal is recorded within a band not higher than about 2 MHz. In the above-mentioned video disk, the band below 2 MHz is substantially empty, and such an EFM signal can be recorded on the video disk with frequency-division multiplexing. In this case, the disk has such spectral distribution as shown in FIG. 8, and it is understood that the respective signals are fully separable.

FIG. 9 is a block diagram of a recording apparatus for the video disk. In the drawing, a television picture signal is processed by a pre-emphasis circuit 1 for pre-emphasizing the high-band component, modulated by a frequency modulator 2, and fed to an adder 3. On the other hand, two-channel audio signals are pre-emphasized by pre-emphasis circuits 4 and 5, modulated by frequency modulators 6 and 7, and fed to the adder 3. Another set of two-channel audio signals are digitized or pulse-code modulated (PCM) by a PCM encoder 8, eight-to-fourteen modulated (EFM) by an EFM encoder 9, filtered by a low-pass filter 10 for removing the unnecessary high-band component, and fed to the adder 3 through a pre-emphasis circuit 11. Accordingly, the adder 3 receives an FM signal of the picture signal, two FM signals of the two-channel audio signals, and an EFM signal of the other two-channel audio signals. These signals are added to each other by the adder 3, passed through a limiter 12 for adjusting the level, and fed to a light modulator 13. As a result, a laser beam emitted from a laser light source 14 is modulated corresponding to the signals and radiated through an objective lens 16 onto an original recording board 17 rotated by a motor 16 so as to record the signals thereon. A technique for producing disks from such an original recording board 17 is commonly known, and detailed description thereof will be omitted.

FIG. 10 is a block diagram of an apparatus for reproducing audio and video signals from such a disk made by the procedure as described above. In the drawing, a laser beam generated from a pickup 23 is radiated through an objective lens 24 onto a disk 22 rotated by a motor 21. The reflected light from the disk 22 is received by the pickup 23 through the objective lens 24 to thereby generate a reproduction signal. The reproduction RF signal is amplified by an amplifier 25. Of the amplified signal, an FM carrier component passed through a band pass filter 26 is fed to a frequency demodulator 27, demodulated thereby, and produced as a picture signal from a de-emphasis circuit 28. FM carrier components passed through band pass filters 29 and 30 are fed to frequency demodulators 31 and 32, demodulated thereby, and produced as two-channel audio signals from de-emphasis circuits 33 and 34, respectively. An EFM signal component separated by a low-pass filter 35 is fed through a de-emphasis circuit 36 successively to an EFM decoder 37 and a PCM decoder 38 to be first EF-demodulated and PC-demodulated thereby, so as to produce two-channel analog audio signals. Accordingly, a TV audience can desirably choose suitable hi-fi audio signals in conjunction with a picture signal.

As the EFM signal, it may be considered to record a digital data signal in place of the audio signal. Unlike the audio signal, the digital data signal is not always continuous, and therefore it is considered advantageous to made the digital signal have a block structure. However, because the clock frequency of the EFM signal is about 44.1 kHz and the frequency of the vertical synchronizing signal is 29.97 Hz, there exists no simple multiply proportional relation between the two. Accordingly, it is difficult to select the position of each data block and the length thereof.

SUMMARY OF THE INVENTION.

It is therefore an object of the present invention to solve the problem in the prior art as described above.

According to the present invention, in a video disk in which a television picture signal and a digital data signal are recorded on one and the same track thereof through frequency-division multiplexing, the digital data signal is divided into blocks each composed of a fixed number of bits, and a terminal part of each of the blocks is recorded in the vicinity of a position corresponding to a vertical synchronizing pulse located at the rearmost of a corresponding frame or field of a television picture signal. As a result, the digital data can be reliably read even in the case where jumping-back is repeated in a still picture reproducing operation or the like.

BRIEF DESCRIPTION OF THE DRAWINGS

FIGS. 4A–4J are timing charts of the recording and reproducing operations;

DETAILED DESCRIPTION OF THE INVENTION

1. The Disk and Recording Apparatus

Figure 1:
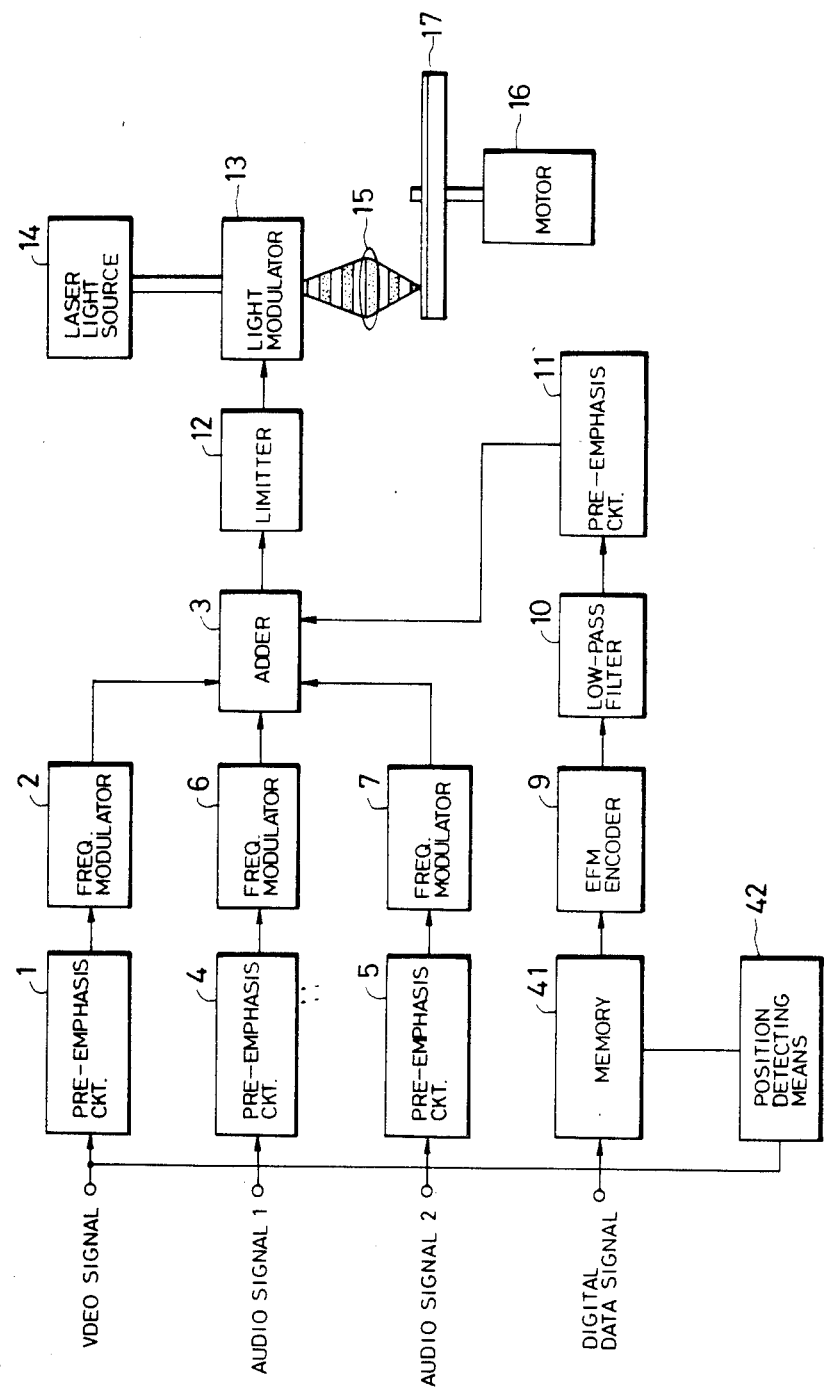
FIG. 1 is a block diagram of a recording apparatus according to the present invention.
Figure 9:
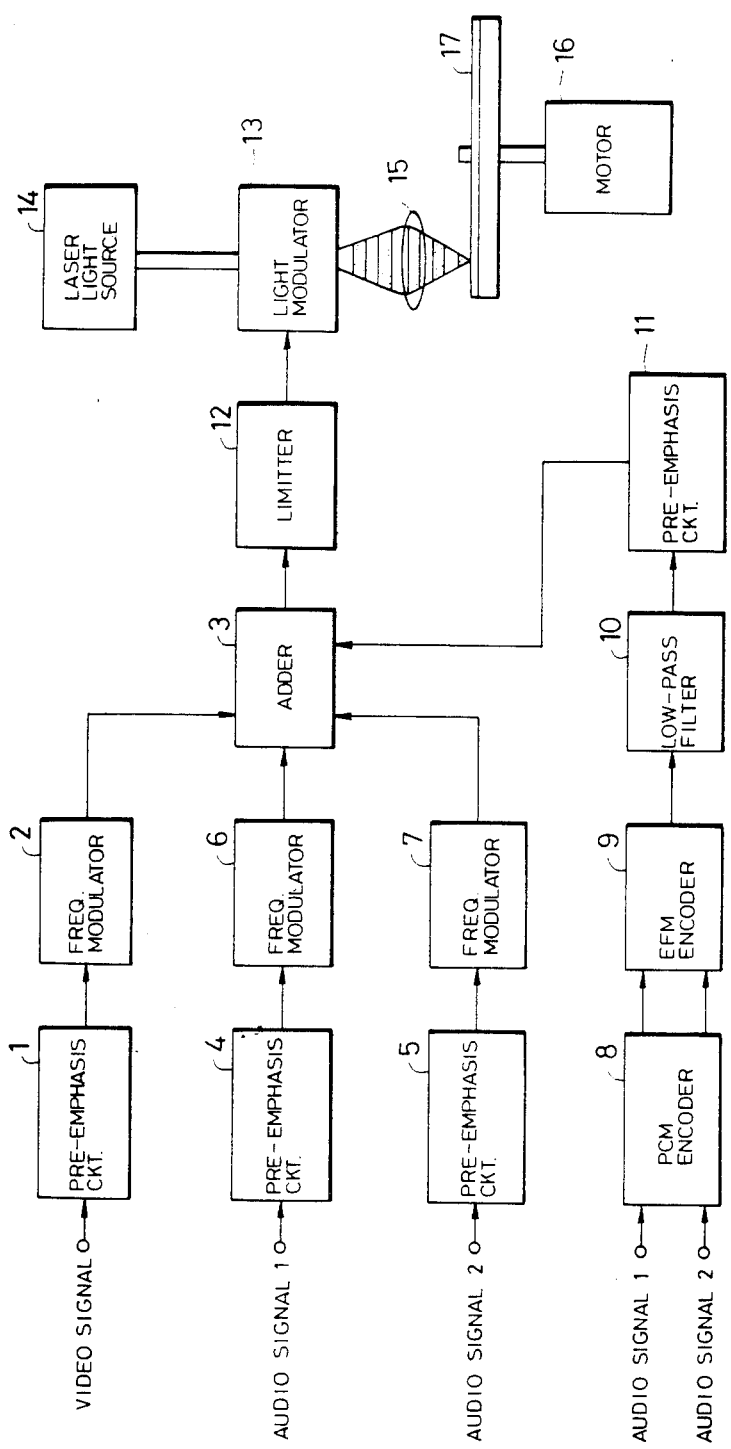
FIG. 9 is a block diagram of a recording apparatus for a conventional optical digital audio disk.

FIG. 1 is a block diagram of an embodiment of the recording apparatus according to the present invention. In FIG. 1, the corresponding parts to those in FIG. 9 are correspondingly reference, and detailed description thereabout is omitted here. Although FIG. 9 shows the case where two-channel audio signals are fed to an EFM encoder 9 through a PMC encoder 8, FIG. 1 shows the case where a digital data signal is fed to an EFM encoder 9 through a memory 41. Of course, a changeover switch or the like may be provided so as to input a selected one of an audio signal and a digital data signal. A position detecting means 42 detects a predetermined position of the video signal to control the memory 41. The construction of other parts is similar to the construction shown in FIG. 9. Namely, a pre-emphasis circuit 1, a frequency modulator 2 and an adder 3 are provided for the picture signal. Pre-emphasis circuits 4 and 5 and frequency modulators 6 and 7 are provided for the two-channel audio signal. A low-pass filter 10 and a pre-emphasis circuit 11 are disposed in the path of the signal from the EFM encoder 9. A limiter 12, a light modulator 13, a laser light source 14, an objective lens 15, a motor 16, and a recording medium 17 are disposed in the path of the signal from the adder 3.

2. Operations of the Disk and Recording Apparatus

The operation of the disk and the recording apparatus will be described hereunder. The video signal and the two-channel audio signal are respectively processed by the pre-emphasis circuits 1, 4 and 5 and the frequency modulator 2, 6 and 7, and are then added to each other by the adder 3 in the same manner as described above. According to the present invention, the position detecting means 42 detects a predetermined position s on the picture signal. The position s is in the vicinity of a vertical synchronizing pulse which is one field before the television picture signal frame which corresponds to the present digital data signal.

Figure 5:
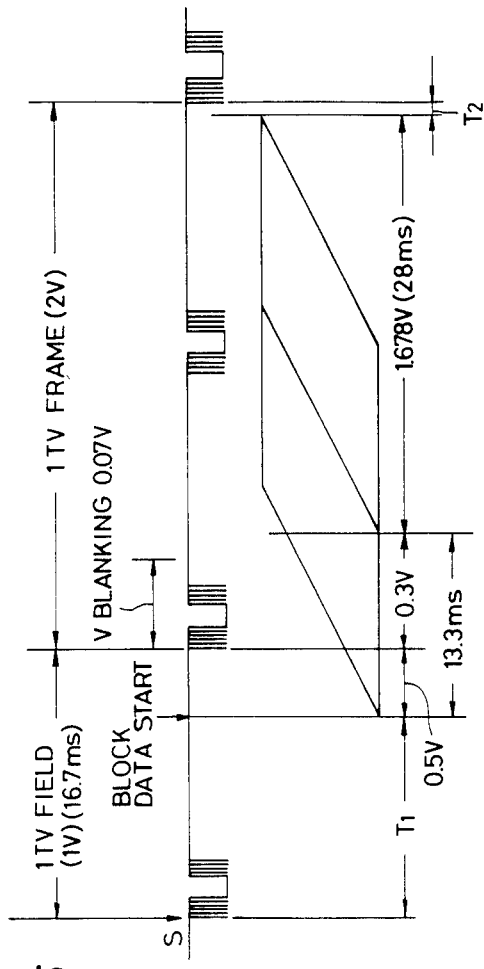
FIG. 5 is an enlarged view of a part of the timing chart of FIGS. 4A–4J.
Figure 6:
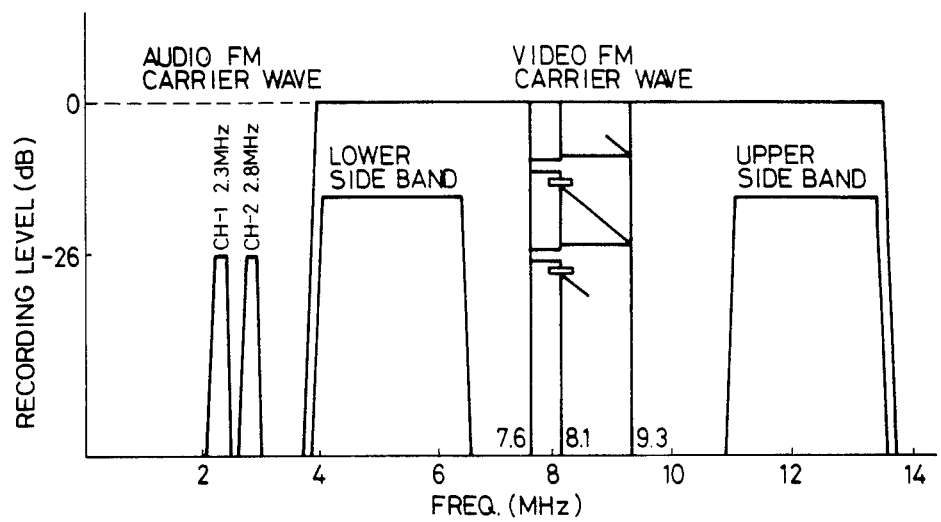
FIG. 6 is a graph showing the spectral distribution of an optical video disk.
Figure 7:
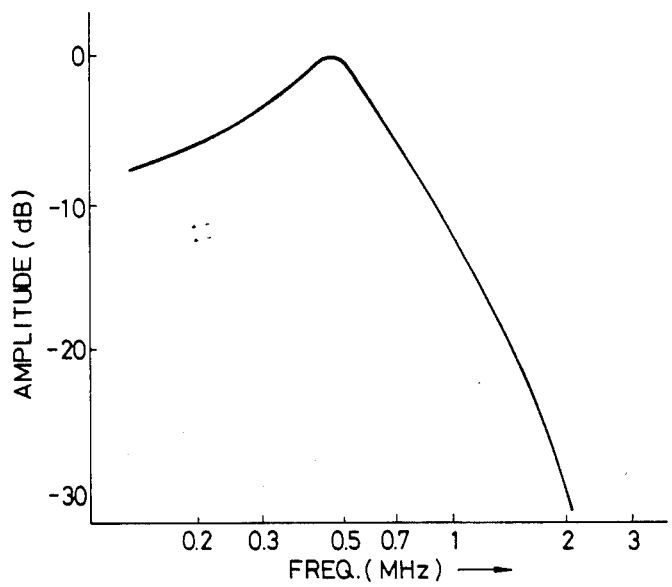
FIG. 7 is a graph showing the spectral distribution of an EFM signal.
Figure 8:
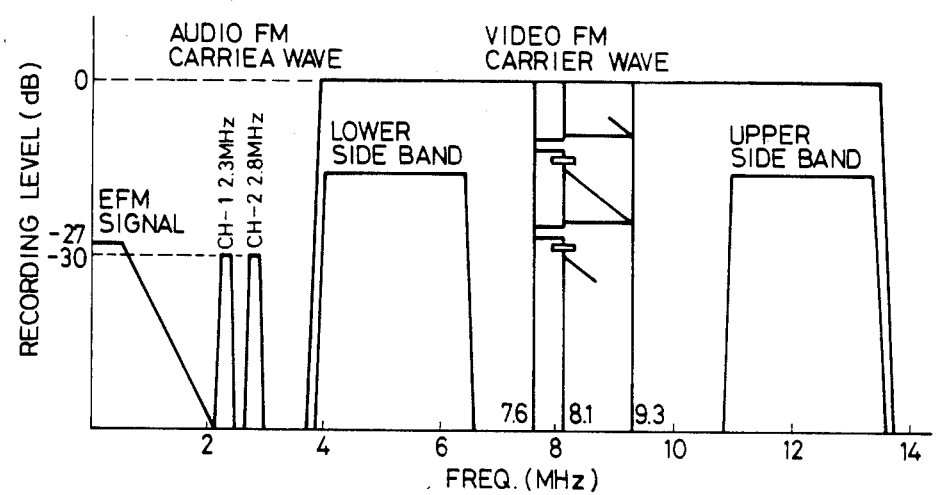
FIG. 8 is a graph showing the spectral distribution of an optical video disk carrying which the EFM signal recorded thereon.

Upon detection of the predetermined position s, the position detecting means 42 starts a timer operation and generates a control signal when a predetermined time $T_1$ has elapsed from the start of the timer operation to cause the memory 41 to output the digital data signal so far stored in the memory 41. For example, let V represent the length of one field, as shown in FIG. 5. In the case where the digital data signal for two blocks is recorded as described later, the timer $T_1$ is calculated by subtracting the length (about 2.5V) of two blocks after interleaving and the idle time $T_2$ from the time (3V) of three fields. If the idle time $T_2$ is disregarded, the time $T_1$ is about 0.5V. The digital data signal released from the memory 41 is fed to the EFM encoder 9 so as to be interleaved or the like, and then fed to the adder 3 through the pre-emphasis circuit 11 so as to be added to the frequency-modulated picture and audio signals. Accordingly, the digital data signal is recorded with the result that the terminal part of the digital data signal is disposed in the vicinity of a position corresponding to the vertical synchronizing pulse at the rearmost of the corresponding frame.

The length of one block of the digital data signal can be determined arbitrarily to be 1 kbytes, 2 kbytes, or the like. For example, in the optical audio disk, one block of the audio signal before EF-modulation is made up of a digital data signal of 2.352 (=24×98) kbytes, that is, 18.816 kbits, corresponding to the block length of 98 frames, each frame being equivalent to 24 bytes. The length of one block of digital data signal before interleaving is about 13.3 ms but the length of one block after interleaving becomes about 28 ms. The difference arises because of the time overlapping on the optical digital audio disk owing to interleaving by the EFM encoder is about 14.7 ms. Because the pulse period of the vertical synchronizing signal (that is, the length of one field) is about 16.7 ms, the length of one block before interleaving is shorter than the pulse period of the vertical synchronizing signal (that is, the length of one field) but the length of the block after interleaving is longer than the length of one field and shorter than the length of one frame (FIG. 5). Accordingly, in the case, for example, as shown in FIG. 4C, a group of two blocks of the digital data signals $Da_1$ and $Da_2$, another group of two blocks of the digital data signals $Db_1$ and $Db_2a$, and so on, are separated from each other in respective frames. These pairs of blocks $Da_1$, $Da_2$ and $Db_1$, $Db_2$ are made to respectively correspond to the picture signal frames A and B. As shown in FIG. 4E, the terminal part in each of the last blocks $D'a_2$, $D'b_2$, and so one, in the respective frames A and B after interleaving is recorded in the vicinity of a position corresponding to the vertical synchronizing pulse of FIG. 4F disposed at the rearmost of the corresponding frame of FIG. 4E. Alternatively, in the case where all the blocks are separated from each other in every field, as shown in FIG. 4B, the terminal part in each of the blocks $D'a_1$, $D'a_2$, $D'b_1$, $D'b_2$, $D'c_1$, and so on, after interleaving, as shown in FIG. 4D, is recorded in the vicinity of a position corresponding to the vertical synchronizing pulse disposed at the rearmost of the corresponding field. Since jumping-back in reproduction should be made within a period of vertical retrace (about 0.07V), the recording apparatus is preferably designed so that the digital data signal is not recorded within a period of vertical retrace containing a vertical synchronizing pulse at the timing for jumping back. Thus, adjacent blocks are convoluted. At this time, the terminal part of the respective blocks $D'a_1$, $D'a_2$, $D'b_1$, $D'b_2$, and so on, after interleaving, as shown in both FIGS. 4D and 4E, are always at positions corresponding to the respective insides of the corresponding the fields $A_1$, $A_2$, $B_1$, $B_2$, and so on, because the terminal end of the last block is disposed in the vicinity of the vertical synchronizing pulse being at the rearmost of the corresponding frame or field.

3. The Reproducing Apparatus

Figure 2:
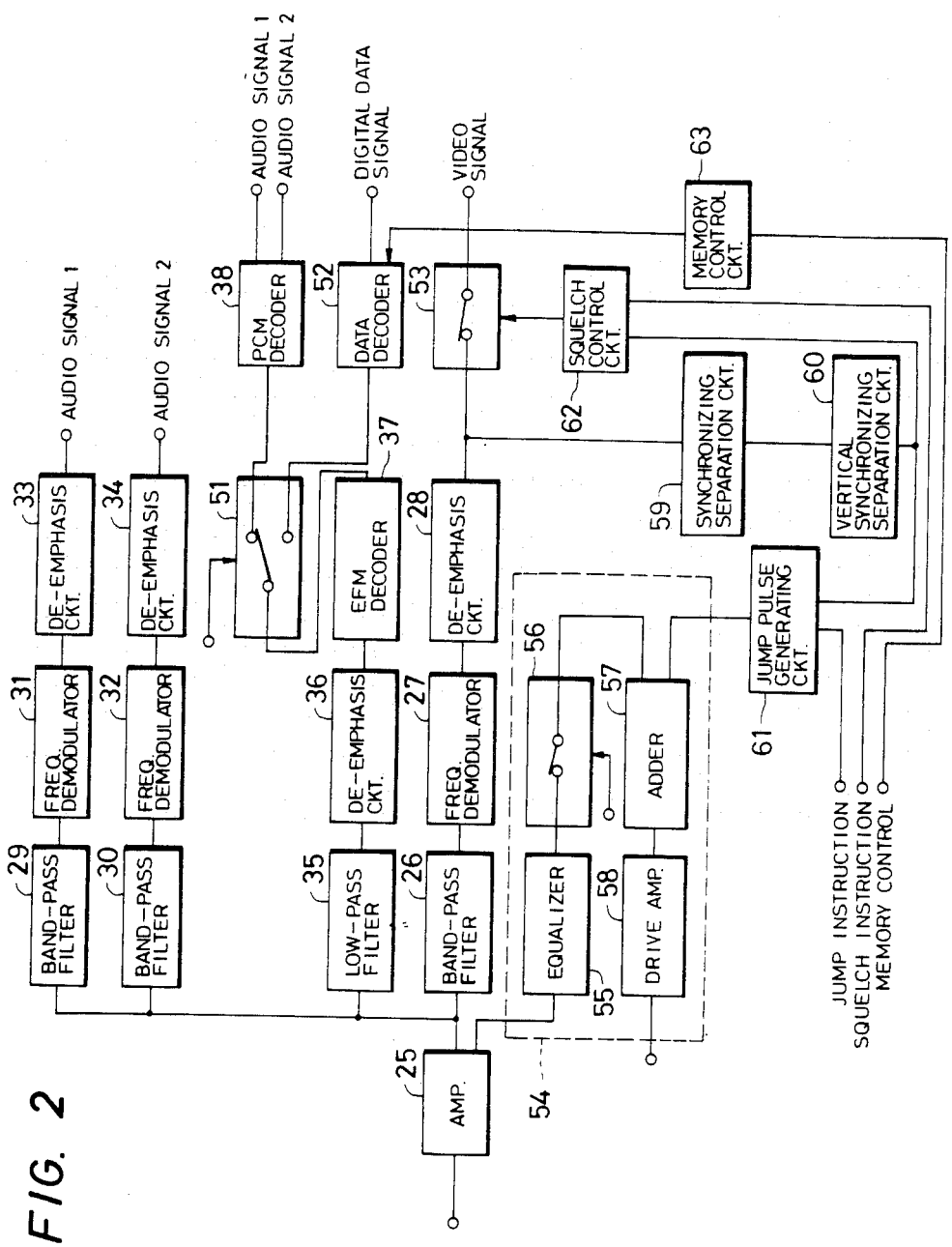
FIG. 2 is a block diagram of a reproducing apparatus according to the invention.
Figure 10:
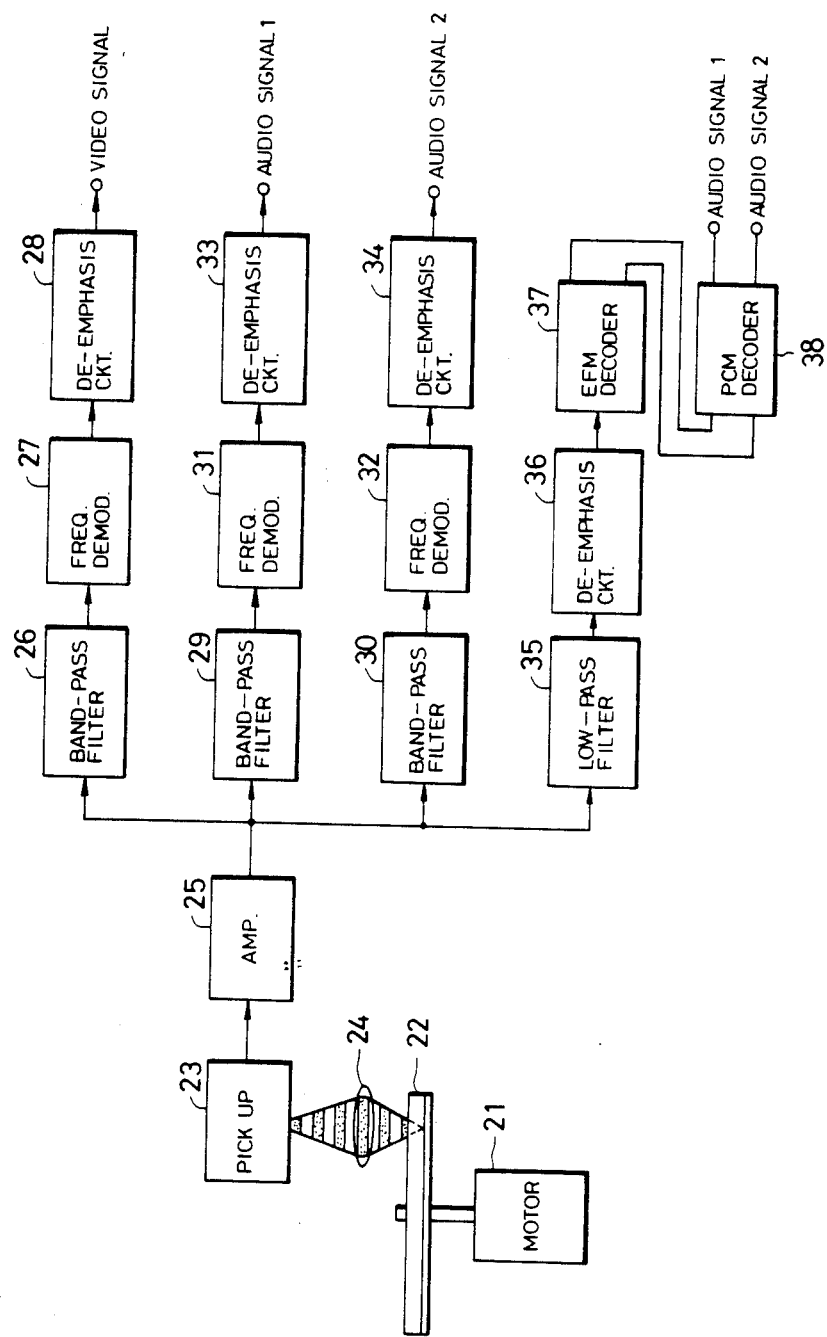
FIG. 10 is a block diagram of a reproducing apparatus for the conventional optical digital audio disk.

FIG. 2 is a block diagram of a reproducing apparatus according to the present invention. In FIG. 2, the parts corresponding to those in FIG. 10 are corresponding referenced and their detailed description is omitted here. In the reproducing apparatus of the invention, the output of an EFM decoder 37 is fed selectively to a data decoder 52 or a PCM decoder 38 through a switch 51. The switch 51 is changed over in response to an instruction from a microcomputer not shown or the like such that the switch 51 turns to the side of a PCM decoder 38 when an audio signal is recorded as an EFM signal, while the switch turns to the side of a data decoder 52 when a digital data signal is recorded. In the case where the PCM decoder 38 can be used also for the digital data signal, it is matter of course that the data decoder 52 may be omitted and that the switch 51 may be provided at the output side of the PCM decoder 38. A switch 53 is used for squelching a picture signal derived from a de-emphasis circuit 28. A tracking control circuit 54 comprises an equalizer 55 for receiving a tracking error signal generated from an amplifier 25, a tracking servo loop switch 56, an adder 57, and a driving amplifier 58 for driving a tracking actuator not shown.

The picture signal from the de-emphasis circuit 28 is successively fed to a synchronizing separation circuit 59 and a vertical synchronizing separation circuit 60, so that a vertical synchronizing signal is separation-detected. The detection signal of the vertical synchronizing signal is fed to both a jump pulse generating circuit 61 and a squelch control circuit 62. A memory control circuit 63 controls a memory (RAM 75 in FIG. 3) of the data decoder 52. The jump pulse generating circuit 61, the squelch control circuit 62 and the memory control circuit 63 respectively receive a jumping instruction signal, a squelching instruction signal and a memory control signal which are generated from the microcomputer.

4. Operation of the Reproducing Apparatus

The operation of the reproducing apparatus, in the case where the EFM signal is not used as a digital data signal, is the same as described above, and the operation of the reproducing apparatus, in the case where in EFM signal is used as a digital data signal, will be described hereunder. For example, when an instruction to search a frame A or a digital data block $D'a_2$ is issued from the microcomputer, the loop switch 56 is opened by the microcomputer to thereby start the operation of searching the frame A or the digital data block $D'a_2$. At the same time, the switch 53 is opened by the squelch-control circuit 62 to thereby squelch the picture signal. When the frame A or the block $D'a_2$ is found, the loop switch 56 is closed to thereby operate the tracking control circuit. Thus, a normal reproducing operation starts from the head position of the frame A.

An EFM signal, in the reproduction signals from the amplifier 25, is fed through a low-pass filter 35 and a de-emphasis circuit 36 to the EFM decoder 37 so as to be EF-demodulated. The EF-demodulated signal is fed to the data decoder 52 through the switch 51, and stored in a predetermined address of the memory corresponding to the signal from the memory control circuit 63. When the storing operation for the digital data block $D'a_2$ is terminated, as shown in FIGS. 4I or 4J, a jumping instruction is issued to the jump-pulse generating circuit 61. In response to this instruction, the jump-pulse generating circuit 61 generates a jump pulse to the adder 57 at the timing where a vertical synchronizing pulse can be detected from the vertical synchronizing separation circuit 60 after a lapse of the time $T_2$. Accordingly, the tracking actuator is operated so that the pickup 23 jumps back by one track (one frame) from the vicinity of the vertical synchronizing pulse being at the rearmost of the frame A to the vicinity of the vertical synchronizing pulse being at the frontmost of the frame A. Thereafter, the operation of reproducing the frame A and the operation of jumping back by one track are alternately repeated to thereby perform stationary reproduction of the frame A, as shown in FIG. 4G.

On the other hand, when the position of the vicinity of the vertical synchronizing pulse being at the frontmost of the frame A is detected, the squelch-control circuit 62 closes the switch 53 to thereby terminate the squelching state. Accordingly, users can observe a still picture of the frame A, as shown in FIG. 4H. When processing of the digital data signal is terminated, the still picture reproducing operation is released and the operation shifts to the next one.

While the pickup 23 is jumping back, the first one $D'a_1$ of the two blocks of data cannot be reproduced completely. To solve the problem, the two blocks of data may be made to have the same contents, so that in the normal reproducing operation, if one block drops out the other block is read. On the other hand, in the still picture reproducing operation, only the rear one of the two blocks is read with the front one disregarded. Of course, alternatively, the two blocks may be made to have different data contents, so that in the still picture reproducing operation, the front one of the two blocks is disregarded. Alternatively, the data processing may be designed to read the front block $D'a_1$ after the reproduction from the vicinity of a vertical synchronizing pulse immediately before the front block $Da_1$ to the vicinity of another vertical synchronizing pulse immediately after the same front block $D'a_1$. Then, the operation is repeated of reproducing the still picture of the frame A till the completion of the reading process. Data processing is performed for the temporarily stored front block $D'a_1$, and data processing is performed for the next block $D'a_2$. In any case, the successively stored terminal part of each block is made to correspond to a vertical synchronizing pulse just before jumping, so that the data to be reproduced during a time where tracking is in an unstable state after jumping is the data of the front block which is to be disregarded and the rear block is reproduced when tracking is in a stable state. Accordingly, it is possible to prevent an error in reading of data caused by the jumping operation.

Figure 3:
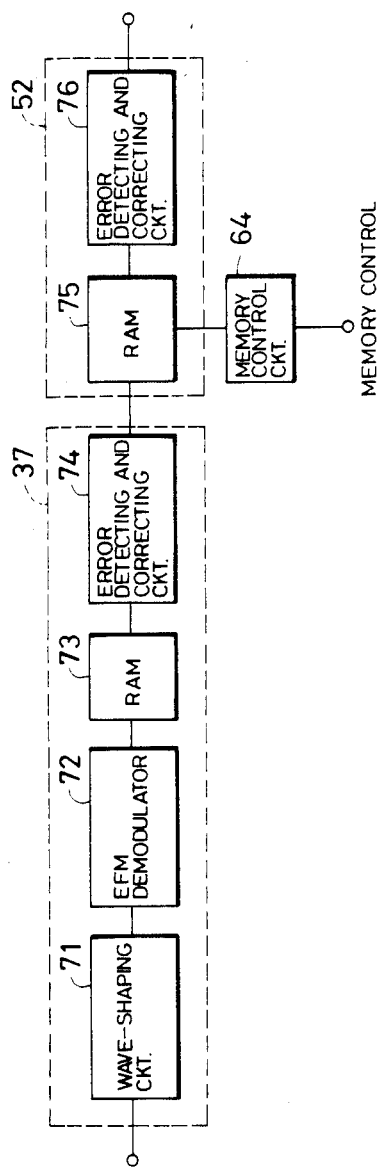
FIG. 3 is a detailed block diagram of a part of the reproducing apparatus.

FIG. 3 is a block diagram showing the EFM decoder 37 and the data decoder 52 in more detail (in the drawing, the switch 51 between the two decoders is omitted). In the EFM decoder 37, the EFM signal fed thereto is shaped by a wave-shaping circuit 71, demodulated by an EFM demodulator 72, temporarily stored in a RAM 73 (for example, of 16 kbits), and corrected by an error detecting and correcting circuit 74 after processing such as de-interleaving or the like. On the other hand, in the data decoder 52, the digital data is temporarily stored in a RAM 75 and corrected by an error detecting and correcting circuit 76 after processing such as de-interleaving or the like by means of the control signal from the memory control circuit 63. If the RAM 75 is made to have a capacity corresponding to an amount of two blocks, that is, about 38 kbits, it is possible to store picture data for one screen at the same time. The capacity of the RAM 75 may be selected to be an amount of one block, that is, about 19 kbits.

As described above, the present invention can provide a video disk in which a television picture signal and a digital data signal are recorded on one track with frequency-division multiplexing. The digital data signal is divided into blocks each composed of a predetermined number of bits. A terminal part in each of the blocks is recorded in the vicinity of a position corresponding to a vertical synchronizing pulse disposed at the rearmost of a corresponding television picture signal frame or field. Accordingly, even if tracking is in an unstable state owing to a jumping-back operation effected in a still picture reproducing operation, or the like, digital data can be reliably read. Furthermore, each block of digital data can be made to correspond to a frame or a field to thereby simplify searching and reproducing of a predetermined picture scene or digital data.

In addition, the time required for squelching the picture signal can be shortened.

What is claimed is:

1. A video disk recording apparatus for recording both a television picture signal and a digital data signal onto one and the same track of a video disk through frequency-division multiplexing, said video disk recording apparatus comprising:

means receiving a television picture signal for modulating said television picture signal;

means receiving a digital data signal for dividing said digital data signal into blocks each composed of a predetermined number of bits;

means receiving an output of said dividing means for modulating said divided digital data signal;

means receiving said television picture signal for detecting from said television picture signal a first vertical synchronizing pulse located at least one field before a frame or a field of a television signal corresponding to each of said blocks so that a terminal part of said each block is disposed in the vicinity of a position corresponding to a second vertical synchronizing pulse located at a rearmost portion of said frame or field corresponding to said each block;

means for adding at least one of said blocks of said modulated digital data signal to said modulated television picture signal, said at least one block beginning after a lapse of predetermined time from the detection of said first vertical synchronizing pulse; and means for recording the added signals onto said video disk.

2. An apparatus for reproducing a video disk carrying a television picture signal and a digital data signal recorded on one and the same track thereof through frequency-division multiplexing, said digital data signal being divided into blocks each composed of a predetermined number of bits, a terminal part of each of said blocks being recorded in the vicinity of a position corresponding to a vertical synchronizing pulse located at a rearmost portion of a corresponding frame or field of a television picture signal, said video disk reproducing apparatus comprising:

separating means comprising first means for decomposing a signal reproduced from said video disk by a pickup into a modulated digital data signal and second means for decomposing said reproduced signal into a modulated television picture signal;

means for detecting from said modulated television picture signal a rearmost vertical synchronizing pulse recorded in the vicinity of a position corresponding to the terminal part of each of said blocks;

means for making said pickup jump back on said video disk from the vicinity of the detected rearmost vertical synchronizing pulse to the vicinity of another vertical synchronizing pulse located one frame or one field before said detected rearmost vertical synchronizing pulse;

first means, receiving an output of said second decomposing means, for reproducing the television picture signal within said frame or field corresponding to said block to thereby, during a period both before and after an operation of said making means, produce a still picture; and second means receiving an output of said first decomposing means and operative simultaneously with said first reproducing means, for reproducing the digital data signal within said block.

3. A video disk recording method for recording both a television picture signal and a digital data signal onto one and the same track of a video disk through frequency-division multiplexing, said video disk recording method comprising:

modulating a television picture signal;

dividing a digital data signal into blocks each composed of a predetermined number of bits, said blocks corresponding to respective ones of fields or frames of said television signal;

modulating said divided digital data signal;

detecting from said television picture signal a first vertical synchronizing pulse located at least one field before one of said frames or fields of said television signal corresponding to each of said blocks adding said modulated digital data signal to said modulated television picture signal after a lapse of a predetermined time from the detection of said first vertical synchronizing pulse, whereby a terminal part of said each block is disposed in the vicinity of a position corresponding to a second vertical synchronizing pulse located at a rearmost portion of said one frame or field corresponding to said each block; and recording the added signals onto said video disk.

4. A method for reproducing a video disk carrying a television picture signal and a digital data signal recorded on one and the same track thereof through frequency-division multiplexing, said digital data signal being divided into blocks each composed of a predetermined number of bits, a terminal part of each of said blocks being recorded in the vicinity of a position corresponding to a vertical synchronizing pulse located at a rearmost portion of a corresponding frame or field of a television picture signal, said video disk reproducing method comprising:

separating a signal reproduced from a video disk into a modulated digital data signal and a modulated television picture signal;

detecting from said reproduced signal a rearmost vertical synchronizing pulse recorded in the vicinity of a position corresponding to a terminal part of each of said blocks;

making a pickup jump back on said video disk from the vicinity of the detected rearmost vertical synchronizing pulse to the vicinity of another vertical synchronizing pulse located one frame or one field before said rearmost vertical synchronizing pulse; and reproducing from said separated modulated television signal the demodulated television picture signal within said frame or field corresponding to said block to thereby produce a still picture following said jump back and, at the same time, reproducing from said separated modulated television picture signal the digital data signal within said block.

* * * * *